Patented Apr. 3, 1928.

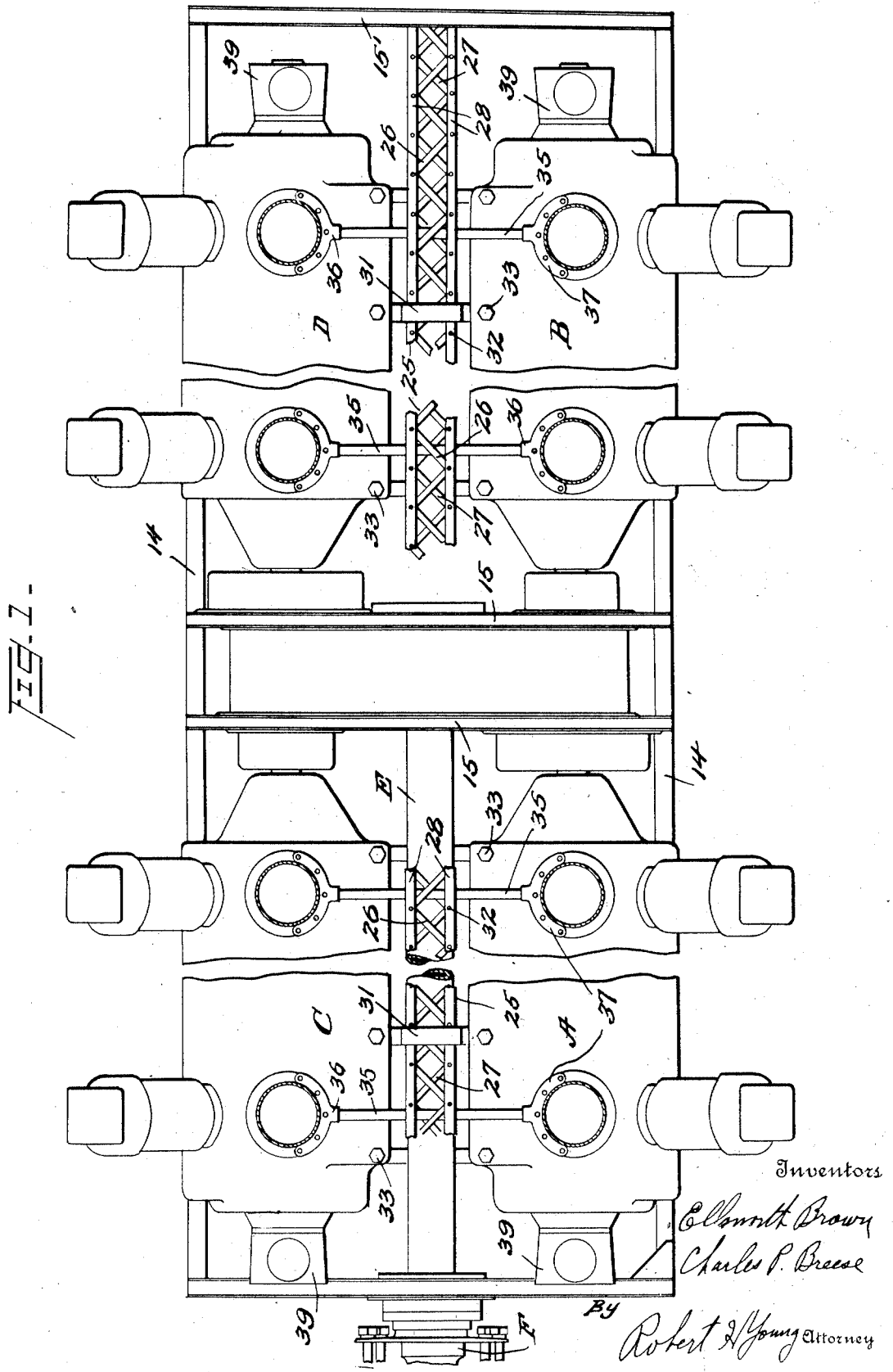

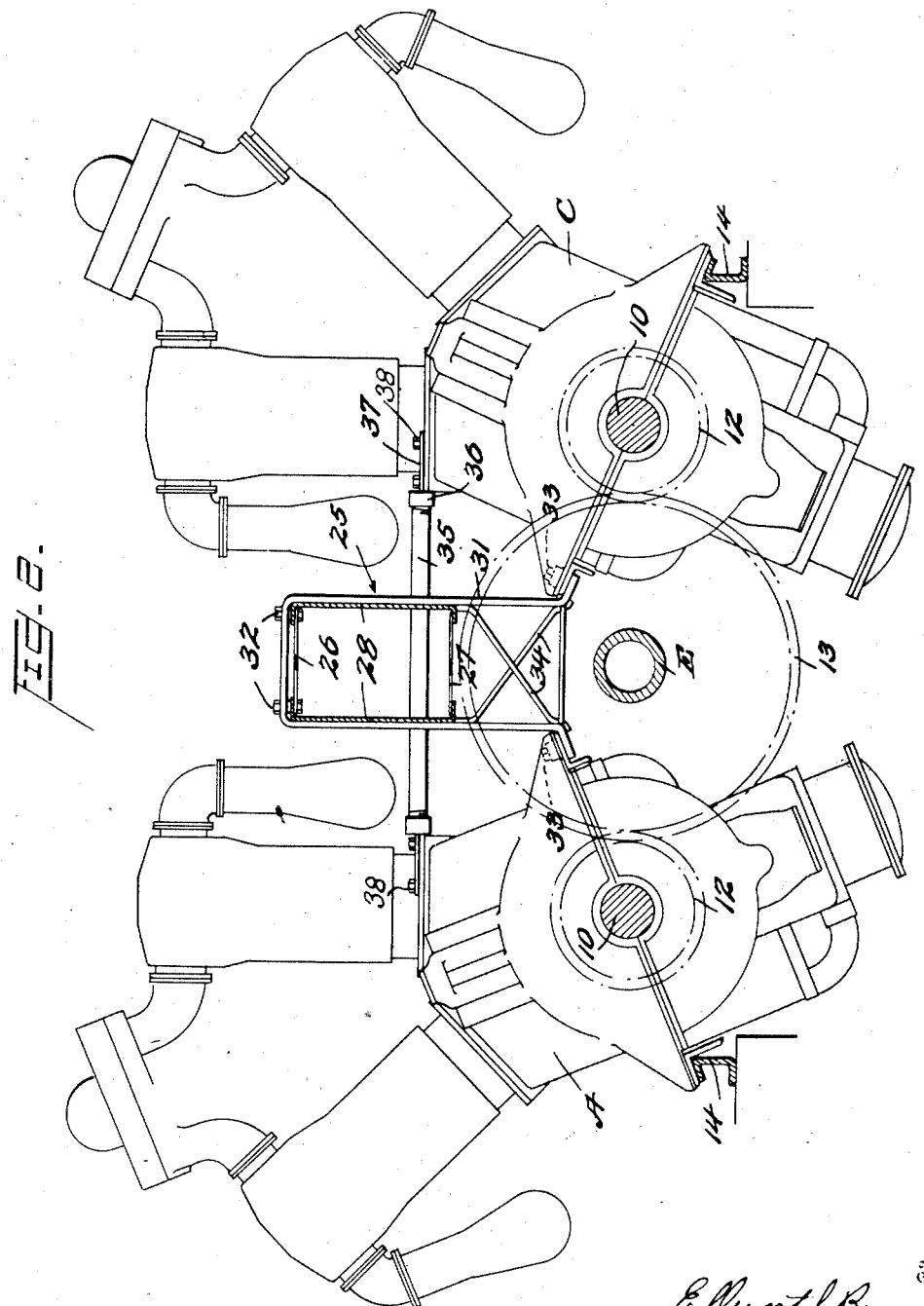

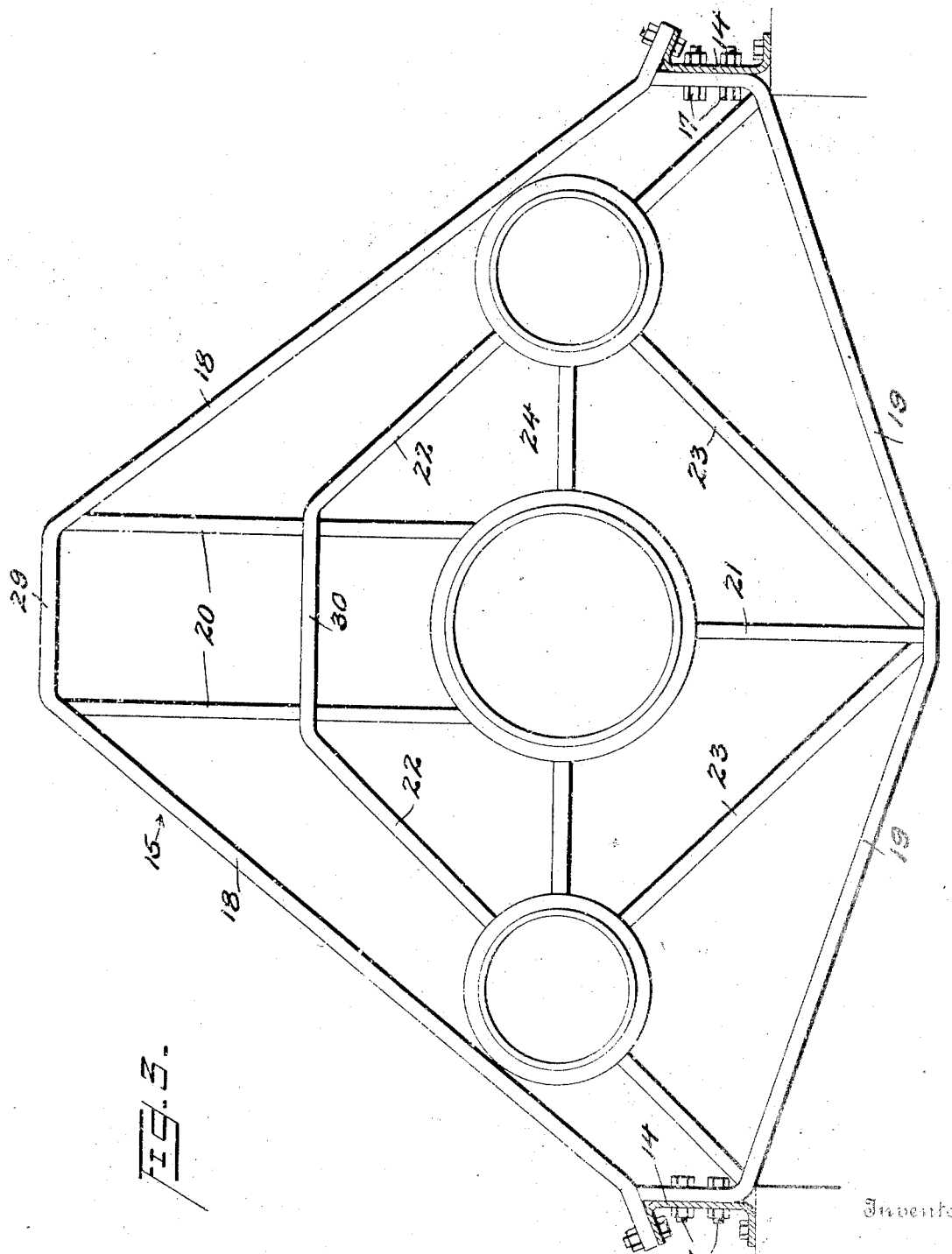

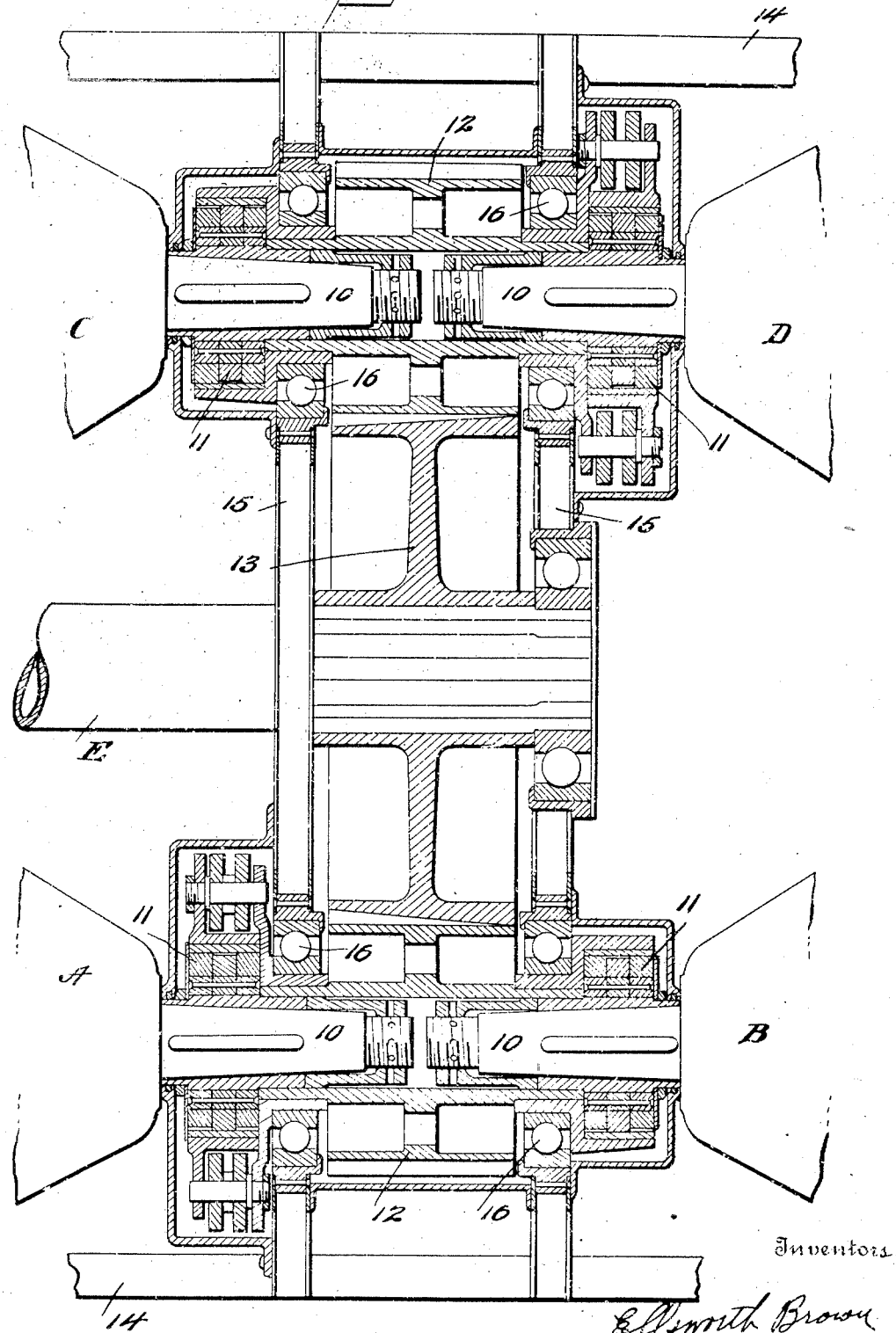

1,664,399

UNITED STATES PATENT OFFICE.

ELLSWORTH BROWN, OF DAYTON, OHIO, AND CHARLES P. BREESE, OF NORFOLK, VIRGINIA.

MULTIPLE-ENGINE DRIVE GEAR.

Application filed August 7, 1923. Serial No. 656,248.

This invention relates to a multiple engine drive gear and will be described and illustrated herein as especially designed for driving the propeller shaft of an airship either of the lighter-than-air or heavier-than-air type. It is to be understood, however, that the driving gear or mechanism, including the transmission gearing may be used in various connections and for various purposes, such, for example, as for driving the propeller shaft of a marine vessel or the propeller shaft of an automobile or truck or any other vehicle where it is necessary or advisable to combine a number of power plant units or engines and transmit the combined energy thereof to a common driven shaft.

A further object of the invention is to produce a multiple engine driving gear in which provision is made for an automatic balance of power or torque between the several engines or power units employed.

A further object of the invention is to produce a power plant of the type above referred to in which, in case of the failure or stoppage of one or more of the engines or power units, the remainder may continue in operation and full effectiveness without any burden being thrown thereon by the engine or engines out of commission at the time.

Other objects and advantages of the invention will appear as the description proceeds, the invention residing in the novel construction, combination and arrangement herein fully described, illustrated and claimed.

In the accompanying drawings—

Figure 1 is a plan view partly in section of the completed power plant;

Figure 2 is a vertical transverse section through the same taken to one side of the center of the power plant;

Figure 3 is a view in elevation of one of the trussed cross frame members;

Figure 4 is an enlarged horizontal section through the transmission gearing.

The power plant or multiple engine drive gear, for the purpose of clear illustration of the invention is shown as comprising four motors of the internal combustion engine type, said motors being represented at A, B, C and D. The pair of engines A B is arranged in tandem with shafts in axial alinement, as shown, and the engines C and D are arranged in like manner. The two pairs of engines A, B and C D are arranged on opposite sides of a central longitudinal driven shaft E, which in the illustrated embodiment of the invention, constitutes the propeller shaft of an airship, said shaft being shown as having an aerial propeller hub F fast on one end thereof. It may be noted at this point that by reason of the engine arrangement the shaft E may be any desired length and may extend beyond both ends of the pairs of engines so that it is practicable to place an aerial propeller on either end of the shaft E or on both ends thereof, as may be found expedient.

The engines A and B are right and left hand engines, that is to say, one of the engines, for example, the engine A, is so designed that the shaft thereof will turn to the right while the shaft of the engine B turns to the left. The same is true of the engines C and D in which the engine C has its shaft arranged to turn to the right while the shaft of the engine D is arranged to turn to the left. This is done in order that the shafts of each pair of engines will rotate and drive in the same direction. It will be observed also that the engines of each pair are arranged with corresponding ends facing each other and the shafts 10 thereof are connected, each by overrunning clutch 11 to a single spur gear or pinion 12, the gears or pinions 12 at opposite sides of the shaft E meshing constantly with a central spur gear 13 which is fast to and rotates with and drives the shaft E. By the means above described, the power of all of the engines is transmitted to the shaft E and each of the engines drives through an overrunning clutch to the respective pinion or gear 12. This provides for an automatic balance of the torque of all of the engines. Suppose, for example, that all of the engines are in operation. Now should one engine lag in speed, the automatic overrunning clutch arrangement shown, immediately throws out or disconnects the lagging engine and puts the load to be carried on the remaining engines, while the engine out of clutch is free to speed up and overtake the other engines. As soon as the speed is equal, the clutch automatically engages and the engine which was lagging again carries its proportion of the load. If one engine should speed ahead of the others, then the others are automatically thrown out of clutch and remain so until the speeds are again equalized by reason of the whole load being thrown on the one engine which has speeded up, thereby slowing such engine down to the speed of the other engines. Thus by the action of the clutches the equality or balance of the load and speed is maintained automatically.

The frame of the power plant is composed of side longitudinal frame members 14 which may be of channeled formation, as shown in Figure 3, said side frame members being connected rigidly together by cross frame members arranged at suitable intervals. Two of such cross frame members 15 are shown at opposite sides of the gears 12 and 13 in Figure 1, so as to form efficient supporting means for radial thrust in the friction ball bearings 16 in which the hubs of the gears 12 and overrunning clutches 11 are mounted. Similar cross frames 15 are arranged at the opposite ends of the frame and one of said cross frame members is shown in detail in Figure 3, wherein it will be observed that said cross frame member is secured by bolts or other fastening means 17 to the side frame members 14, above referred to. It will also be observed that the cross frame member 15 comprises marginal frame members 18 and 19 diverging from the frame members 14 upwardly, downwardly and inwardly, being connected to the upper vertical members and a lower vertical member 21, additional tension and thrust, frame members 22 and 23 extending diagonally between the members 20 and the horizontal cross member 24, the members 23 extending between the horizontal frame member 24 and the vertical frame member 21. All of the elements of the cross frame member 15 are arranged so as to take the tension and compression exerted by the power plant.

The frame and power plant also comprises a central slightly elevated backbone 25 of box girder-like formation the same being shown in top plan view in Figure 1 and in vertical cross section in Figure 2. Said backbone or girder comprises an upper lattice work side 26 and lower side 27 preferably of the same formation for the sake of strength and lightness and said top and bottom members of the girders are connected rigidly together by side members 28 which may be of the same formation as the top and bottom members 26 and 27. The girder or backbone extends the entire length of the frame and is supported by the cross frame members 15 and 15' and lies between and in contact with and is secured to the vertical members 20 of the cross frame members and also between overlying and underlying connecting portions 29 and 30 of the frame elements 18 and 22, above referred to. It will now be seen that the cross frame members 15 and 15' form a stout and rugged bracing connection between the backbone or box girder 25 and the side frame members 14. Inverted stirrups 31 extend over the box girder or backbone 25 to which they are secured by bolts 32 or equivalent means. The lower arms of the stirrups are bent outwardly in opposite directions and secured to the crank cases of the motors at opposite sides thereof by bolts 33 or the equivalent thereof. Thus the inner sides of the crank cases of the engines are hung from the backbone or box girder 25. The lower arms of the stirrups are connected by X-braces 34 thus giving still greater rigidity to the structure.

In addition to the braces hereinabove described, we employ cross tie braces 35 which may be of tubular construction if desired and provided at their opposite extremities with right and left hand threaded portions which screw into internal threaded lugs 36 on gravity brackets or plates 37. This arrangement of tie-brace provides for lining up of each pair of engines A, B and C, D and also for bringing all of said shafts into exact parallel relation to the driven shaft E. The brackets 37 are secured to the engines by bolts or other fastening means 38.

Another important feature of the invention is shown in Figure 2 wherein it will be observed that the normal vertical center lines of the engines arranged at opposite sides of the driven shaft E are inclined in opposite directions or diverge upwardly and the said vertical center lines of the engines are also at an angle to and diverge upwardly from the vertical center line of the driven shaft E.

This gives a more compact arrangement of the engines comprising the power plant and provides for the convenient arrangement of the cross braces 35 and the proper lining up of the engine shafts with respect to each other and the driven shaft E.

Each engine is equipped with an equivalent or separate engine starter 39. This enables the engines to be started separately and when they are all finally put in operation, the combined power generated thereby is transmitted by mechanism hereinabove described to the common driven shaft E.

We claim—

1. A multiple engine drive gear embodying, in combination, a driven shaft, engines arranged in pairs in tandem on each side of the driven shaft, each pair consisting of a right hand and left hand engine the corresponding ends of which face each other, transmission gearing between said pairs of engines and the driven shaft, and transverse tie braces connecting the engines at opposite sides of the driven shaft and longitudinally extensible to properly line up the shafts of each pair of engines and render them parallel to the driven shaft.

2. A multiple engine drive gear embodying in combination a driven shaft, a plurality of engines to the number of two or more arranged on opposite sides of the driven shaft, transmission means between said engines and said driven shaft and adjustable means connecting said engines on the opposite sides of said driven shaft to properly line up the shafts of said engines and render them parallel to the driven shaft.

In testimony whereof we affix our signatures.

ELLSWORTH BROWN.
CHARLES P. BREESE.